United States Patent
Yamaguchi et al.

[11] Patent Number: 6,113,185
[45] Date of Patent: Sep. 5, 2000

[54] VEHICLE SEAT

[75] Inventors: Hiroyoshi Yamaguchi; Tomoharu Ohi, both of Yokohama, Japan

[73] Assignee: NHK Spring Co., Ltd., Yokohama, Japan

[21] Appl. No.: 09/404,682

[22] Filed: Sep. 23, 1999

[30] Foreign Application Priority Data

Sep. 29, 1998 [JP] Japan .................... 10-274703

[51] Int. Cl.⁷ ............... B60N 2/02; B60N 2/42; B60R 21/02
[52] U.S. Cl. .............. 297/216.1; 296/68.1; 280/748
[58] Field of Search ............. 296/68.1; 297/216; 280/748

[56] References Cited

U.S. PATENT DOCUMENTS

| | | | |
|---|---|---|---|
| 3,591,232 | 7/1971 | Simon | 296/68.1 |
| 3,858,930 | 1/1975 | Calandra et al. | 296/68.1 |
| 5,340,185 | 8/1994 | Vollmer . | |
| 5,490,706 | 2/1996 | Totani | 296/68.1 |
| 5,538,117 | 7/1996 | Bouchez | 296/68.1 |
| 5,556,160 | 9/1996 | Mikami | 297/216.1 |
| 5,567,006 | 10/1996 | McCarthy | 297/216.1 |
| 5,695,242 | 12/1997 | Barntman et al. | 297/216.1 |
| 5,908,219 | 6/1999 | Bohmler | 297/216.1 |

FOREIGN PATENT DOCUMENTS

| | | |
|---|---|---|
| 5-229378 | 9/1993 | Japan . |
| 7-27240 | 6/1995 | Japan . |

*Primary Examiner*—D. Glenn Dayoan
*Assistant Examiner*—Greg Blankenship
*Attorney, Agent, or Firm*—Frishauf, Holtz, Goodman, Langer & Chick, P.C.

[57] ABSTRACT

A submarine preventing mechanism is arrange inside a seat. The submarine preventing mechanism is provided with brackets attached to a cushion flame, links, and a submarine preventing body supported by the links. The links have first ends rotatably supported by the brackets by means of support shafts, respectively. The links have second ends located at a lower level than the support shafts. The submarine preventing body includes a first rod, a second rod, and a gas generator for generating a gas with which the second rod is pulled into the first rod at the time of a vehicle collision. If the vehicle collision occurs, the gas generator burns, generating a gas. In response to this, the second rod is pulled into the first rod. Accordingly, the links are rotated upward, raising the submarine preventing body.

5 Claims, 13 Drawing Sheets

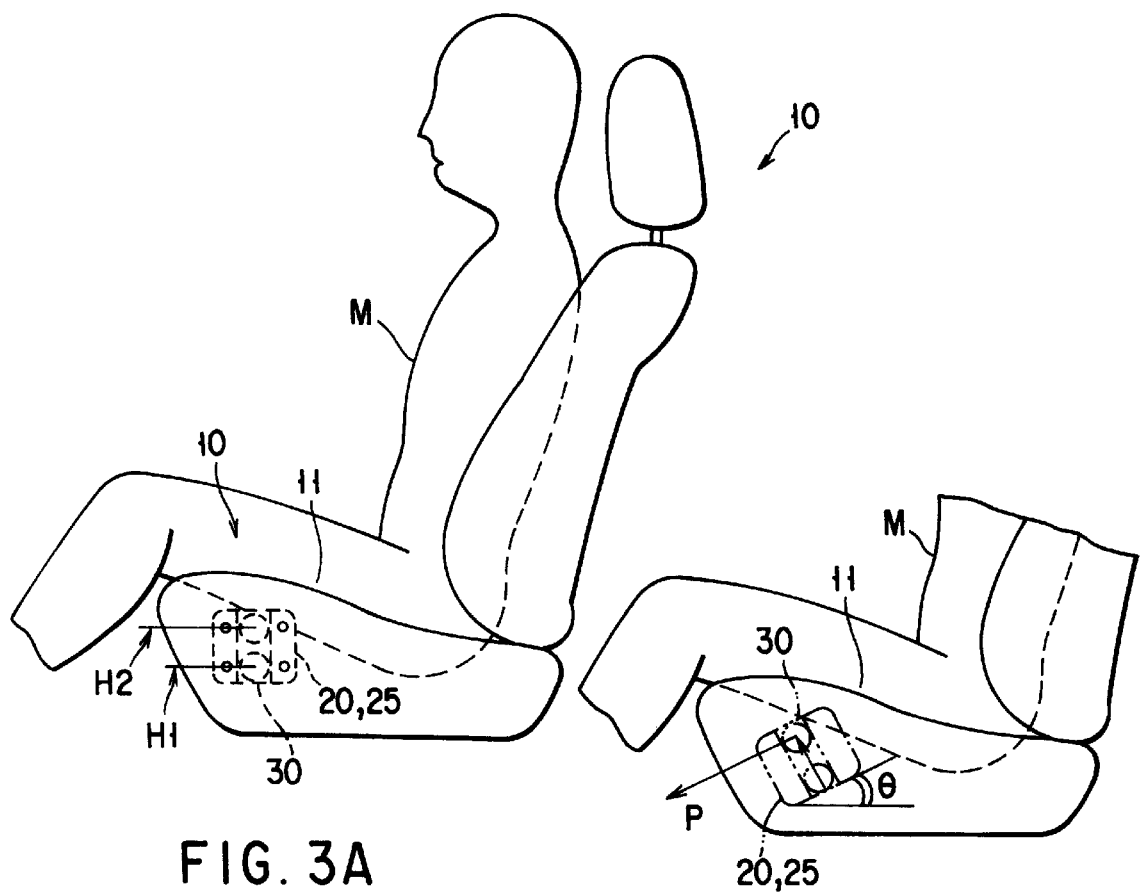
FIG. 3A
FIG. 3B
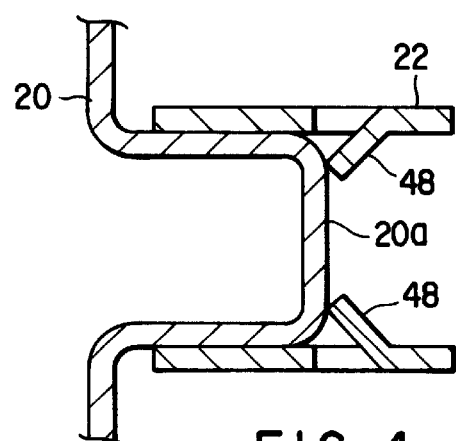
FIG. 4

VEHICLE SEAT

BACKGROUND OF THE INVENTION

The present invention relates to a vehicle seat, which is used, for example, as a front or rear seat of an automobile and prevents a submarine phenomenon at the time of a head-on collision.

The driver or a passenger of an automobile should fasten his or her seat belt and wear it properly. If the seat belt is not worn properly, it may disengage from the waist of the driver or passenger at the time of a head-on collision, and the driver or passenger may be thrown out of the seat belt. This is generally referred to as a "submarine phenomenon" or simply "submarine." If this phenomenon occurs, the buttocks or legs of the driver or passenger may be thrown forward, with the seat belt in engagement with the abdomen. In some cases, the legs may collide with the installment panel, which is located in front of the driver or passenger.

To prevent this submarine phenomenon, a seat frame having a projection or a panel at the front end is known in the conventional art. A submarine preventing mechanism which mechanically raises the front end portion of a seat is also known. In addition, a submarine preventing mechanism that employs an air bag (Jpn. Pat. Appln. KOKAI Publication No. 5-229378) and a submarine preventing mechanism that utilizes a gunpowder actuator to raise the front portion of a seat (Jpn. Utility Model Appln. Kokoku Publication No. 7-27240), are proposed.

However, the conventional structure that employs a projection or a panel cannot reliably prevent a submarine, since the frame is likely to bend in the form of "V." The conventional structure that employs an air bag and the structure that mechanically raises the front portion of a seat cushion may be reliable in performance, but they are inevitably complex. In other words, they employ a large number of elements and are not compact in size. Hence, they cannot be easily arranged in the restricted space inside a seat cushion, resulting in difficulty in the determination of layout. In this manner, the conventional structures are not suitable as commercial products.

BRIEF SUMMARY OF THE INVENTION

Accordingly, an object of the present invention is to provide a vehicle seat having a submarine preventing mechanism which is simple and compact in size and which reliably prevents a submarine phenomenon.

A vehicle seat of the present invention comprises:

a cushion frame;

a pair of brackets provided at the respective side portions of the cushion frame;

a submarine preventing body arranged between the brackets and including a first rod, a second rod inserted into the first rod to be axially movable, and an actuator which has a gas generator that generates a gas at the time of a vehicle collision, the second rod being pushed into the first rod in response to generation of the gas from the gas generator; and a pair of links, arranged between the brackets and the respective ends of the submarine preventing body, for connecting the submarine preventing body to the brackets in such a manner as to raise the submarine preventing body when the second rod is pulled into the first rod.

According to the present invention, the gas generator generates a gas when a collision is sensed. In response to the generation of the gas, the second rod of the submarine preventing body is pulled into the first rod, and the links operate in such a way as to instantaneously move the submarine preventing body to the upper position. Accordingly, the submarine phenomenon, wherein the driver or passenger is sunk in the seat cushion, is prevented.

A vehicle seat provided with the submarine preventing mechanism of the present invention is advantageous in that the submarine preventing body is usually located at a position deep in the seat cushion and does not give uncomfortable feelings to the driver or passenger sitting on the seat. If a vehicle collision occurs, the submarine preventing body moves to the upper position instantaneously. Since the submarine phenomenon is reliably prevented, the safety of the driver or passenger is ensured. In addition, the submarine preventing mechanism of the present invention is simple in structure, since its submarine preventing body is of an actuator-incorporated type and is thus compact in size. The submarine preventing mechanism is made up of a small number of parts and can be easily assembled in the restricted space inside the seat cushion. The submarine preventing mechanism of the present invention is applicable not only to the front seats of an automobile but also to the rear seats.

The submarine preventing body incorporates an actuator and assembled as a unit together therewith. With this structure, the submarine preventing body can be easily assembled in the interior of a seat cushion. In addition, the submarine preventing body can be easily assembled to various types of seat cushion frames, and the assembly can be performed without reference to the types of the seats. In this manner, the layout can be determined with a high degree of freedom.

When the submarine preventing mechanism operates, the second rod is pulled into the first rod. Since this pulling movement increases the overlap portion of the first and second rods, the strength and rigidity of the submarine preventing body can be enhanced. Even if the actuator is operated by mistake when the submarine preventing mechanism is assembled to a cushion frame, the rod does not project outward, thus ensuring safety of the assembler.

According to the present invention, each of the two links has a first end and a second end. The first end of each of the links is rotatably supported by a bracket by means of a support shaft. The second end of one of the two links is rotatably coupled to the end of the first rod by means of a connection shaft at a position lower than the support shaft; likewise, the second end of the other link is rotatably coupled to the end of the second rod by means of another connection shaft at a position lower than the support shaft. The support shafts, the first and second rods and the connection shafts are arranged to satisfy the following relationships:

$$L > L1 > L2$$

where L is a distance by which the two support shafts are away from each other, L1 is a distance by which the connection shafts are away from each other before the second rod is pulled into the first rod, and L2 is a distance by which the connection shafts are away from each other after the second rod is pulled into the first rod.

When the second rod is pulled into the first rod, the links are rotated and raised. Simultaneous with this, the submarine preventing body is raised. With this structure, the movement of the second rod into the first rod serves to rotate and raise the links, thereby moving the submarine preventing body to a desired height level.

According to the present invention, each bracket may have a hole extending in the vertical direction. In the case of this structure, a bolt is inserted into the hole from above, so as to fix the bracket to the seat cushion. This structure is advantageous in that the bracket can be assembled to the seat cushion by fastening the bolt from above. This is what is referred to as vertical-direction fastening, which enables efficient assembly.

According to the present invention, the submarine preventing body may be provided with a deformation adjuster section at end portions which are close to the respective brackets. The deformation adjuster section is a section which can be deformed more easily than the longitudinal center of the submarine preventing body when the submarine preventing body is exerted on by the load of the driver from above at the time of collision. When the submarine preventing body is raised by collision, it can be deformed to have a desirable shape, due to the deformation adjuster sections. This structure is effective in distributing the load of the driver or passenger, thus enabling a contact pressure reduction.

According to the present invention, the actuator may be provided with a cylinder which contains the gas generator, and an operating member which is inserted in the cylinder and moves in such a direction as to extend from the cylinder when the gas generator generates a gas. In this case, one end of the actuator is supported by the first rod and the other end thereof is supported by the second rod in such a manner that the second rod is pulled into the first rod when the operating member moves and projects from the cylinder.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3A is a side view of the seat depicted in FIG. 1.

FIG. 3B is a side view showing a modified manner in which the submarine preventing mechanism of the seat is fixed.

FIG. 4 is a sectional view of part of the seat depicted in FIG. 1.

DETAILED DESCRIPTION OF THE INVENTION

First Embodiment (FIGS. 1–6)

Figure 1:
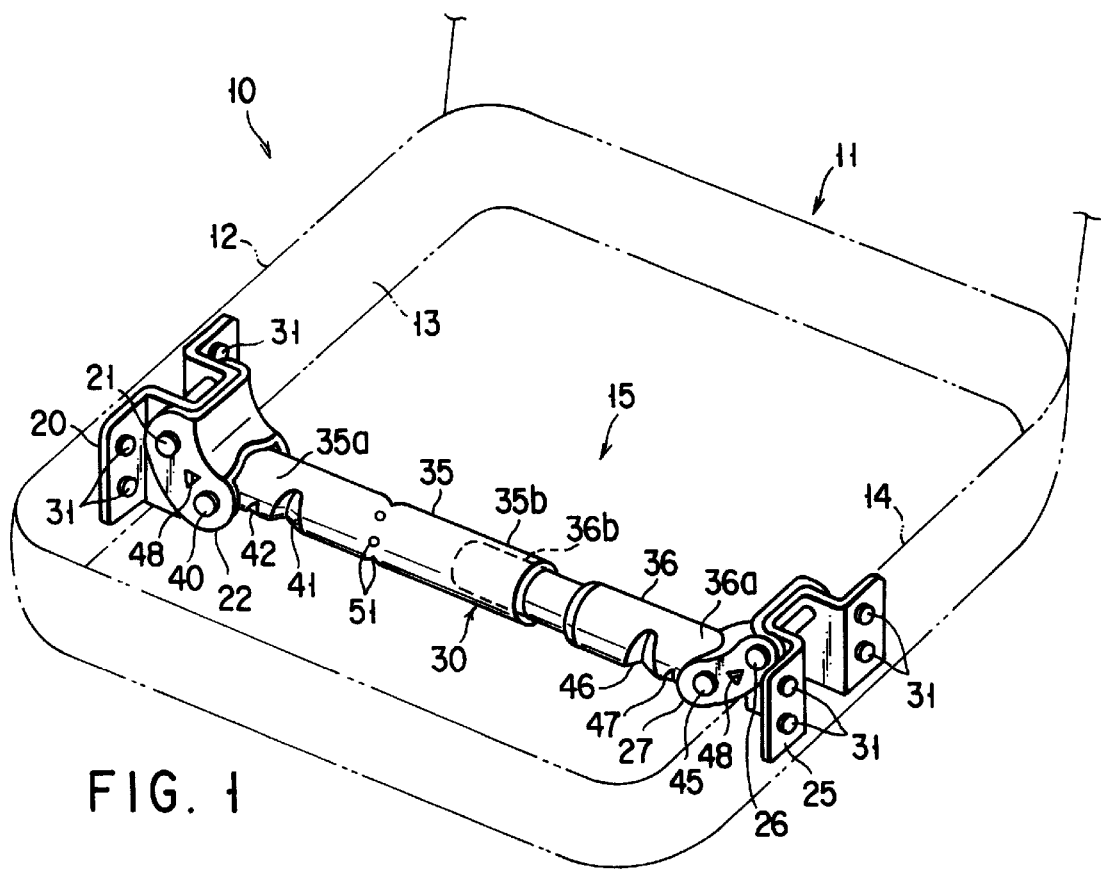
FIG. 1 is a perspective view showing a vehicle seat according to the first embodiment of the present invention.

FIG. 1 shows a vehicle seat 10 according to the first embodiment of the present invention. The vehicle seat 10 comprises a frame (cushion frame) 12 used for supporting a seat cushion 11, and a submarine preventing mechanism 15 arranged between a pair of side frame portions 13 and 14 (which are right and left portions of the frame 12).

The submarine preventing mechanism 15 is made up of: a first bracket 20 fixed to one of the side frame portions, i.e., side frame portion 13; a first link 22 which is supported by means of a support shaft 21 extending in the lengthwise direction of the seat cushion 11 and which is rotatable in the vertical direction; a second bracket 25 fixed to the other side frame portion 14; a second link 27 which is supported by means of a support shaft 26 extending in the lengthwise direction of the seat and which is rotatable in the vertical direction; a submarine preventing body 30 arranged between the first and second links 22 and 27 and extending in the widthwise direction of the seat cushion 11.

The first and second links 22 and 27 have first ends which are supported by the support shafts 21 and 26, and second ends which are suspended ends vertically rotatable with the support shafts 21 and 26 as centers of rotation. Each of the brackets 20 and 25 has a hat shaped cross section when viewed from above. The brackets 20 and 25 are fixed to the side frame portions 13 and 14, respectively, by means of fixing means such as fastening members 31 (e.g. bolts or rivets) or welding.

The submarine preventing body 30 includes a hollow first rod 35 extending across the cushion frame 12 (in the widthwise direction of the seat), and a second rod 36 inserted into the first rod 35 in the axial direction. The first and second rods are aligned with each other.

One end 35a of the first rod 35 is rotatably supported by the second end of the first link 22 by means of a connection shaft 40 extending in parallel to the support shaft 21. The position where end 35a is rotatably supported is lower than the position of the support shaft 21. The first rod 35 has depressions 41 and 42 formed by plastically working the region closer to end 35a. Due to the formation of these depressions, the geometrical moment of inertia acting in the vertical direction is smaller at portions closer to end 35a than at portions closer to the center of the seat. The other end 35b of the first rod 35 is open and has an inner diameter enabling insertion of the second rod 36.

One end 36a of the second rod 36 is rotatably supported by the second end of the second link 27 by means of a connection shaft 45 extending in parallel to the support shaft 26. The position where end 36a is rotatably supported is lower than the position of the support shaft 26. The second rod 36 has depressions 46 and 47 formed by plastically working the region closer to end 36a. Due to the formation of these depressions, the geometrical moment of inertia acting in the vertical direction is smaller at portions closer to end 36a than at portions closer to the center of the seat.

The other end 36b of the second rod 36 is smaller in diameter than the one end 36a, and is inserted into the interior of the fist rod 35 through the open end 35b. The first and second rods 35 and 36 are axially movable relative to each other, with end 36b of the second rod 36 fitted in the hollow section of end 35b of the first rod 35.

Figure 2:
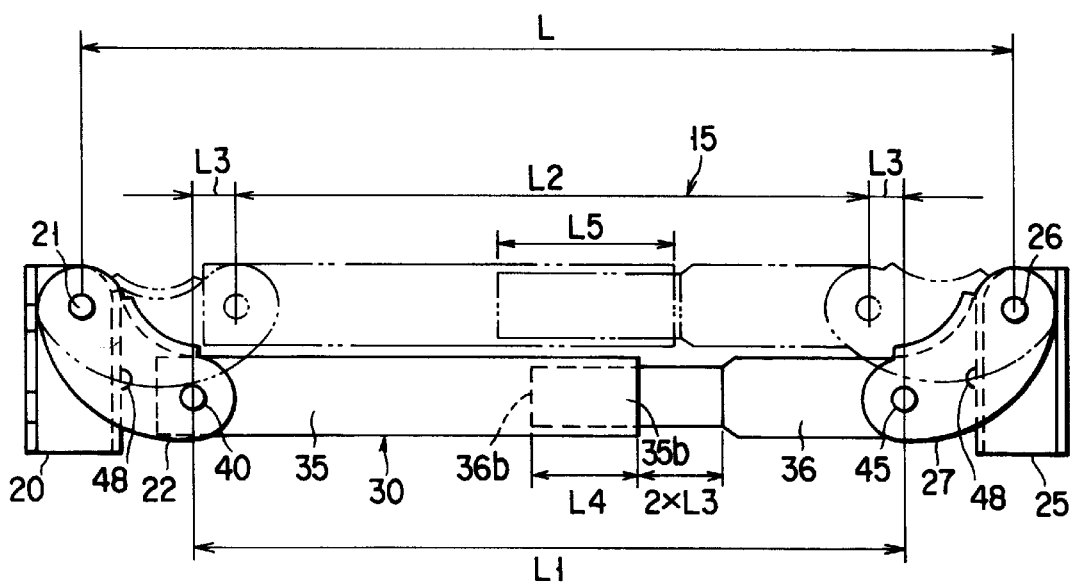
FIG. 2 is a front view of the seat depicted in FIG. 1.

As shown in FIG. 2, the first and second links 22 and 27 are vertically rotatable between a lower position indicated by the full line in FIG. 2 and an upper position indicated by the two-dot-and-dash line in FIG. 2. Let us assume that L1 denotes the distance by which the connection shafts 40 and 45 are away from each other when the links 22 and 27 are at the lower position and L2 denotes the distance by which the connection shafts 40 and 45 are away from each other when the links 22 and 27 are at the upper position. In this case, L2 is shorter than L1 by (2×L3).

To put the above in another way, the submarine preventing body 30 is at the lower position (i.e., at height level H1 indicated in FIG. 3A) when the distance between the connection shafts 40 and 45 is L1. The submarine preventing body 30 moves from the lower position to the upper position (i.e., at height level H2 indicated in FIG. 3A) when it is shortening until the distance between the connection shafts 40 and 45 is L2. The support shafts 21 and 26, the first and second rods 35 and 36 and the connection shafts 40 and 45 are arranged to satisfy the following relationships:

$$L > L1 > L2$$

where L is a distance by which the two support shafts 21 and 26 are away from each other, L1 is a distance by which the connection shafts 40 and 45 are away from each other before the second rod 36 is pulled into the first rod 35, and L2 is a distance by which the connection shafts 40 and 45 are away from each other after the second rod 36 is pulled into the first rod 35.

The two links 22 and 27 are similar in structure, and the first link 22 is depicted in FIG. 4 as an example of them. As depicted, the first link 22 has stoppers 48 which can be brought into contact with the side wall 20a of the bracket 20. The stopper 48 can be formed, for example, by cutting and bending part of the link 22. When the link 22 is rotated to the lower position described above, the stoppers 48 are brought into contact with the side surface 20a of the bracket 20, thus preventing the link 22 to from further rotating downward. The second link 27 also has such stoppers 48 as described above.

In the state where the submarine preventing body 30 is coupled to the brackets 20 and 25 through the links 22 and 27, the distance between the connection shafts 40 and 45 does not exceed L1. With this structure, the overlap between the first and second rods 35 and 36 is fully long, and the length of the overlap varies between L4 and L5 in the rotatable range of the links 22 and 27 (i.e., the vertically movable range of the submarine preventing body 30), as shown in FIG. 2. The stoppers 48 need not be of a type formed by cutting and bending part of the links. Instead of employing the stoppers of such a type, the end faces of the rods 35 and 36 may be brought into contact with the brackets 20 and 25, so as to control the lower limit position of the links 22 and 27.

Figure 5:
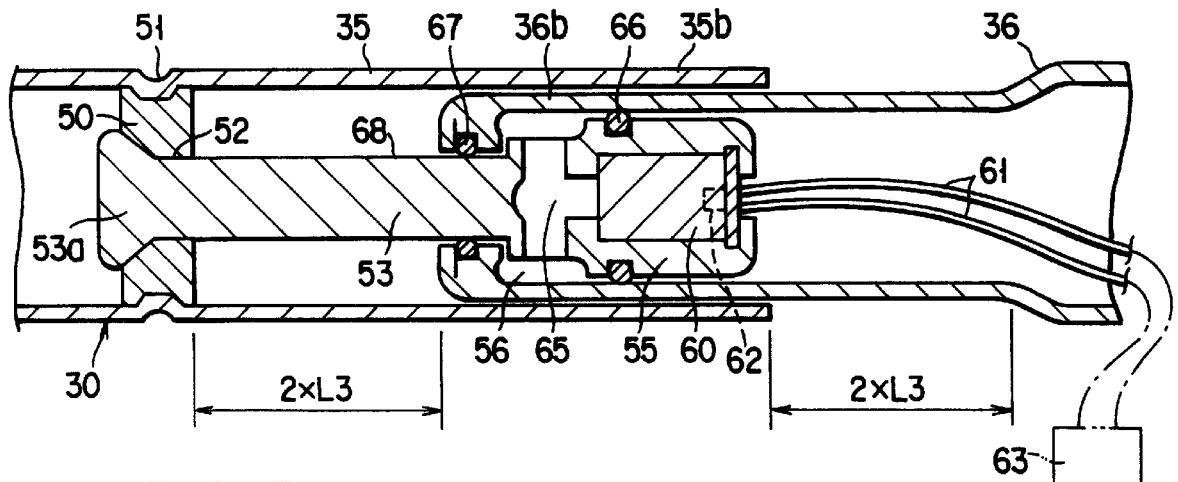
FIG. 5 is a sectional view of part of the submarine preventing mechanism of the seat depicted in FIG. 5.

The submarine preventing body 30 incorporates an actuator, and an example of this type of submarine preventing body is shown in FIG. 5. The body shown in FIG. 5 comprises a collar 50 arranged inside the cylindrical first rod 35 and located at an axially middle point. The collar 50 is secured inside the first rod 35. An example of the method for securing the collar is crimping. That is, the first rod 35 is crimped externally so that the inner wall of the crimped part slightly projects inward by plastic deformation. Needless to say, the collar 50 may be secured in methods other than crimping. Numeral 51 denotes the crimping portion.

The collar 50 has a through hole 52 formed in the center of the collar 50. The proximal end 53a of a center rod 53 is inserted into the through hole 52 of the collar 50 and is secured to the collar 50 by crimping, for example. By means of the collar 50, the center rod 53 and the first rod 35 form an integral body. The center rod 53 is coaxial with the first rod 35.

A piston 55 is arranged at the distal end of the center rod 53. The piston 55 is inserted in the second rod 36 and is movable in the axial direction of the second rod 36. A gas expansion chamber 56, to be described later, is defined between the center rod 53 and the second rod 36.

A gas generator (squib or a powder-containing device) 60 is arranged inside the piston 55. The gas generator 60 has an ignition system 62 having leads 61 extending therefrom. The leads 61 are connected to a sensor 63, which senses a vehicle collision. When a collision is sensed, an electric current is supplied through the leads 61 to the ignition system 62, thereby setting off the gas generator 60. As a result, the gas generator 60 burns instantaneously, generating a gas. As the sensor 63, it is possible to employ a collision detecting sensor adapted for use with an air bag. Where such a sensor is employed, the gas generator 60 operates in synchronism with the expansion of an air bag.

A gas path 65 is formed inside the piston 55. This gas path 65 communicates with the gas expansion chamber 56 defined between the center rod 53 and the second rod 36. A seal member 66 (e.g., an O-ring) with which to seal the gas expansion chamber 56, is provided for the piston 55. Another seal member 67 (e.g., an O-ring) with which to seal the gas expansion chamber 56, is provided for the second rod 36. The axially-middle portion of the center rod 53, i.e., the portion located between the piston 55 and the proximal end 53a, constitutes a columnar shaft 68 along which the end 36b of the second rod 36 is allowed to slide in the axial direction.

Figure 6:
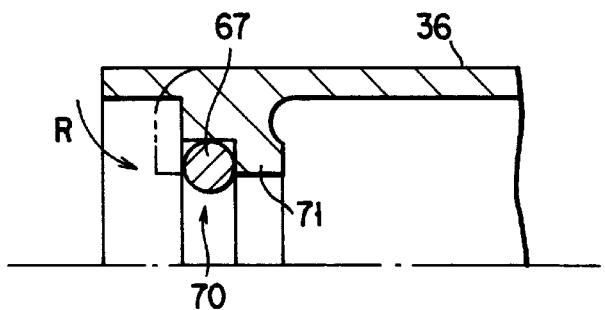
FIG. 6 is a sectional view showing how the seal retainer section of the submarine preventing mechanism of FIG. 5 is before it is worked.

FIG. 6 shows a seal retainer section 70 for retaining the seal member 67 of the second rod 36. FIG. 6 shows how the seal retainer section 70 is before it is worked. First, the seal member 67 is fitted in the stepped portion 71 of the seal retainer section 70. Then, the extended edge at the distal end of the second rod 36 is bent in the direction indicated by arrow R. With the seal retainer section 70 being worked in this manner, the seal member 67 is prevented from disengaging from the end 36b of the rod 36. The seal retainer section 70 of this structure is advantageous in that a seal can be provided easily and in a short time in comparison with the case where the inner circumferential surface of the second rod 36 is worked to have a seal receiving groove.

A description will now be given of the operation of the first embodiment shown in FIGS. 1–6.

The submarine preventing body 30 of the first embodiment is assembled to the cushion frame 12 by means of the links 22 and 27 and the brackets 20 and 25, in the state where the length of the submarine preventing body 30 is L1. When the vehicle is in the normal driving condition (when no collision is detected), the submarine preventing body 30 is at the lower position (at height level H1) shown in FIG. 3A. In this state, the driver M or passenger of the vehicle can sit on the seat without being made uncomfortable by the submarine preventing body 30.

When the sensor 63 senses a collision, an electric current is supplied through the leads 61 to the ignition system 62, thereby setting off the gas generator 60. As a result, the gas generator 60 burns instantaneously. The gas generated thereby jets into the gas expansion chamber 56 by way of the gas path 65. Since the second rod 36 is pulled into the first rod 35, the distance between the connection shafts 40 and 45 shortens to L2. In accordance with this, the submarine preventing body 30 is moved to the upper position H2 shown in FIG. 3A. Hence, the buttocks or legs of the driver M or passenger do not sink in the seat, thus preventing the occurrence of a submarine phenomenon.

When the submarine preventing mechanism 15 operates, the second rod 36 is pulled into the first rod 35, increasing the length of the overlap between the rods 35 and 36 from L4 to L5. With this structure, the overlap, or the submarine preventing body 30, is strong and rigid enough to withstand a heavy load even if that load exceeds the gravitational acceleration.

The force that is applied from the driver or passenger to the submarine preventing body 30 at the time of a collision acts in a direction perpendicular to the direction in which the rods 35 and 36 disengage from each other. In addition to this, the second rod 36 is pulled into the first rod 35, increasing the length of the overlap between the two rods 35 and 36. It is therefore possible to omit a return stop mechanism, which could prevent the second rod 36 from pulling out of the first rod 35 after being inserted into it.

In the first embodiment, the reaction to the force caused by the gas jetted when the gas generator 60 burns causes the center rod 53 and the collar 50 to move the first rod 35 rightward, as viewed in FIG. 5. It is therefore possible to make the most of the energy caused by the jetted gas. To be more specific, the reaction produced by the jetted gas serves to move the first rod 35 rightward, and the internal pressure increased by the jetted gas serves to drive the second rod 36 leftward. Accordingly, the rods 35 and 36 can be operated with high efficiency or without a significant loss of energy.

There may be a case where the submarine preventing body 30 will be deformed by the load of the driver or passenger (i.e., the load applied in a frontward and downward direction) at the time of a collision. In such a case, the end portions of the submarine preventing body 30 are more likely to be deformed than the central portion thereof since the depressions 41, 42, 46 and 47 are formed near the end portions. This structure helps distribute the load applied to the submarine preventing body 30. This feature will be detailed later with reference to the thirteenth embodiment shown in FIGS. 19B and 20.

As described above, the vehicle seat 10 of the first embodiment is characterized in that the submarine preventing body 30 does not cause any uncomfortable feelings when the vehicle is driven in a normal manner, and the submarine preventing body 30 is raised to a certain height level to reliably prevent the submarine phenomenon at the time of a collision.

When the gas generator 60 burns, the second rod 36 is pulled into the first rod 35. Owing to this feature, even if the submarine preventing body 30 is actuated by mistake during assembly to the seat 10 or removal therefrom, it does not endanger the assembler since the rods 35 and 36 do not move in an extending direction.

As shown in FIG. 3B, the submarine preventing mechanism 15 may be assembled to the cushion frame 12 with an inclination angle θ, in such a manner that the submarine preventing body 30 moves up in the direction perpendicular to the direction in which the driver or passenger M moves at the time of a collision (i.e., the driver or passenger is urged in a frontward and downward direction. Where the submarine preventing mechanism 15 is assembled in this manner, it is not subjected to torque when the load P is exerted thereon.

Figure 7:
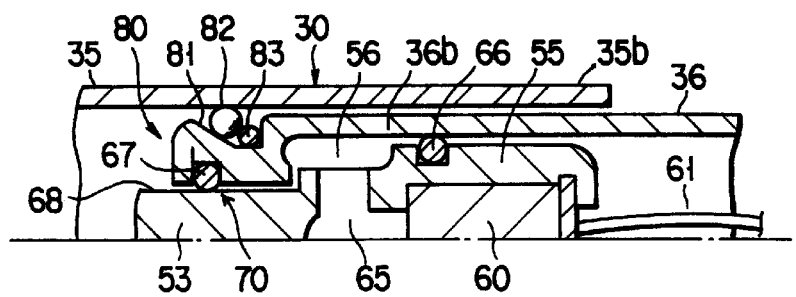
FIG. 7 is a sectional view of part of a submarine preventing mechanism which is according to the second embodiment and which comprises a return stop mechanism.

Second Embodiment (FIG. 7)

According to the embodiment shown in FIG. 7, the submarine preventing body 30 is provided with a return stop mechanism 80. At the time of a collision, the gas generator 60 burns, and the second rod 36 is pulled into the first rod 35. Thereafter, the second rod 36 is prevented from moving in the opposite direction by the return stop mechanism 80. The return stop mechanism 80 is realized by providing a tapered circumferential surface 81 at the distal end 36b of the second rod 36. In other words, the distal end of the second rod 36 decreases in outer diameter from the tip to the proximal side, as shown in FIG. 7. A number of rolling members 82 (e.g., balls) are interposed between the tapered surface and the inner surface of the first rod 35 in such a manner that the balls are arranged in the circumferential direction of the second rod 36. An elastic member (e.g., a rubber O-ring) 83 is arranged between the tapered surface 81 and the inner surface of the first rod 35 to push the rolling members 82 against the tapered surface.

The submarine preventing body 30 having the return stop mechanism 80 operates as follows: When the second rod 36 is pulled into the first rod 35 in response to the combustion of the gas generator 60, the rolling members 82 tend to move away from the tapered surface 81. Accordingly, the second rod 36 is allowed to move into the first rod 35. After the second rod 36 moves into the first rod 35, they do not move in an extending direction even if a force causing them to move in such a direction is exerted. This is because the rolling members 82 are brought into tight contact with the tapered surface 81, stopping and locking the second rod 36. As in the case of a so-called one-way linear clutch, the rods 35 and 36 are prevented from moving in an extending direction. Accordingly, the submarine preventing body 30 is reliably held at the upper position H2.

The second embodiment described above and the embodiments described below are similar to the first embodiment in terms of the fundamental structure and operation of the seat 10. Hence, the structural components used in common to the embodiments are represented by the same reference numerals, and a description of such components will be omitted herein.

Figure 8:
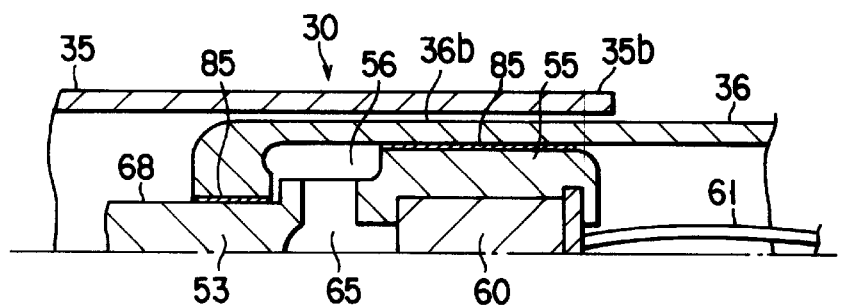
FIG. 8 is a sectional view of part of a submarine preventing mechanism which is according to the third embodiment.

Third Embodiment (FIG. 8)

In this embodiment, the seal members 66 and 67 (FIG. 5) of the first embodiment are not employed. Instead, the sliding portions between the center rod 53 and the second rod 36 are coated with grease 85, such as high-viscosity grease, so as to provide the sliding portions with seal characteristics. The gas generator 60 is made to burn only once. In addition, the gas generator 60 is required to have sealing characteristics only when the gas is generated and expands. This means that the sliding portions described above are only required to maintain the pressure of the gas that is being generated and expanding. The high-viscosity grease 85 coated on the sliding portions eliminates the need to employ the seal members 66 and 67 (O-rings) of the first embodiment, let alone the need to form grooves for receiving them. Since the third embodiment is effective in reducing the number of components employed and the number of steps executed, it contributes to a cost reduction.

Figure 9:
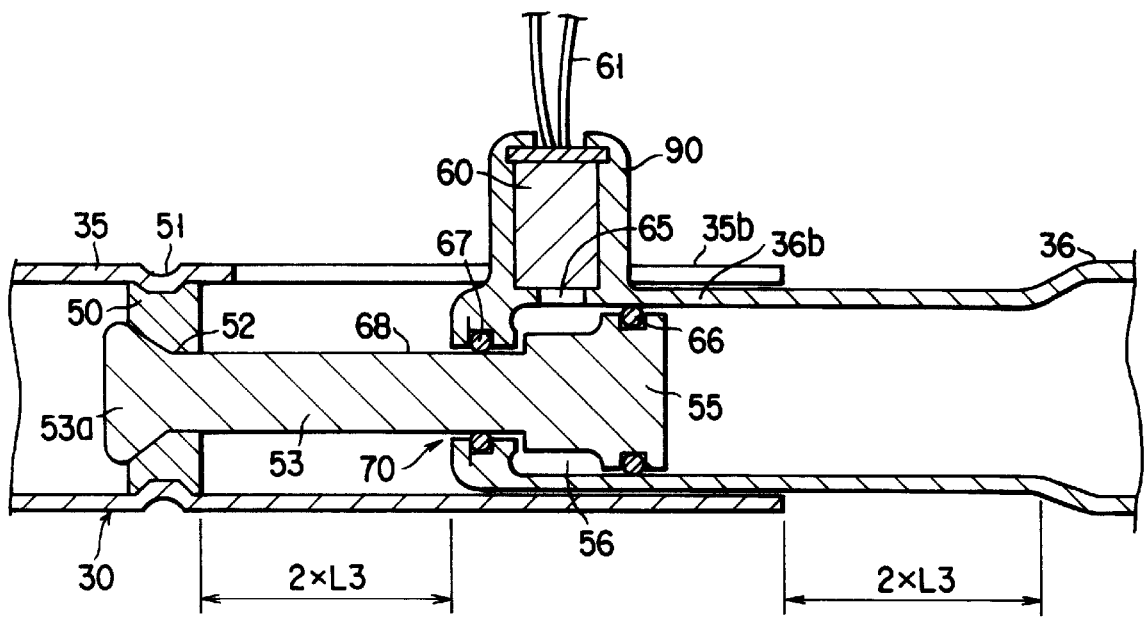
FIG. 9 is a sectional view of part of a submarine preventing mechanism according to the fourth embodiment.

Fourth Embodiment (FIG. 9)

In this embodiment, a chamber 90 is provided in such a manner as to project from the side of the second rod 36, and the gas generator 60 is arranged in that chamber 90. If, in this embodiment, the chamber 90 containing the gas generator 60 is provided outside the second rod 36, the gas generator 60, which must be handled with the greatest possible care, can be assembled at the end of the assembling process. Accordingly, an accident is prevented when the submarine preventing body 30 is assembled.

Figure 10:
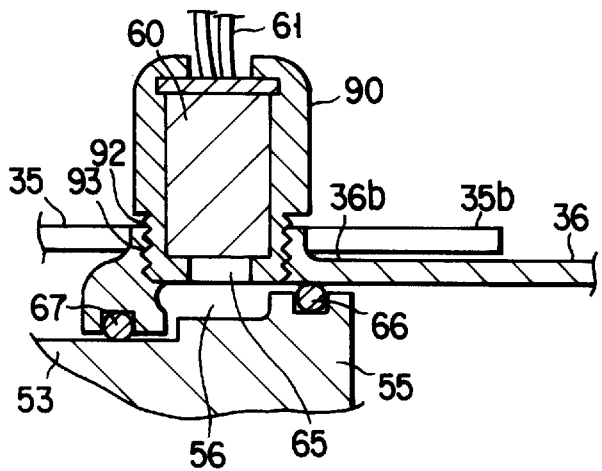
FIG. 10 is a sectional view of part of a submarine preventing mechanism according to the fifth embodiment.

Fifth Embodiment (FIG. 10)

This embodiment is similar to the fourth embodiment in that the gas generator 60 is arranged in the chamber 90 projected from the side of the second rod 36. However, the chamber 90 of the fifth embodiment has a male screw portion 92, and the second rod 36 has a female screw portion 93. With the male screw portion 92 engaged with the female screw portion 93, the chamber 90 is secured to the second rod 36. This screw-in type of chamber 90 is advantageous in that it can be easily assembled to the second rod 36, together with the gas generator 60 contained therein.

Figure 11:
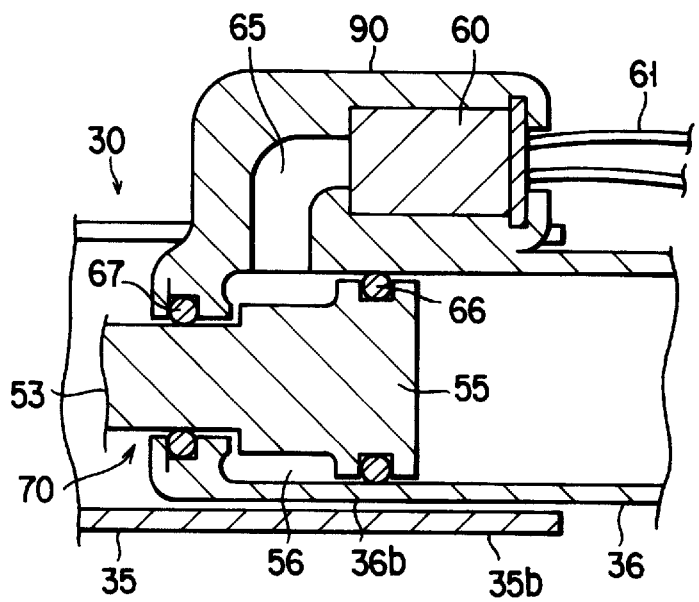
FIG. 11 is a sectional view of part of a submarine preventing mechanism according to the sixth embodiment.

Sixth Embodiment (FIG. 11)

In this embodiment, the chamber 90 containing the gas generator 60 is arranged on the side of the second rod 36 in such a manner that the longitudinal axis of the chamber 90 is parallel to that of the second rod 36. Since the chamber 90 is not much projected from the side of the second rod 36, the structure of the sixth embodiment is advantageous in reducing the installation space required. The chamber 90 may be of a screw-in type, as in the fifth embodiment shown in FIG. 10.

Figure 12:
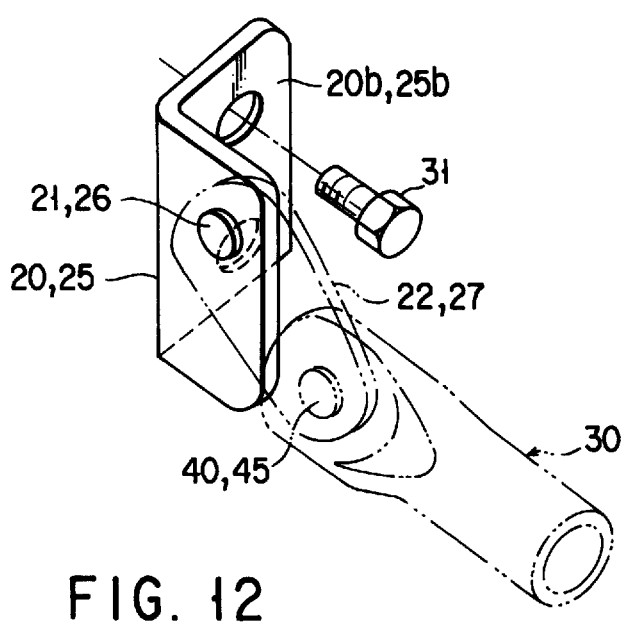
FIG. 12 is a perspective view of part of a submarine preventing mechanism according to the seventh embodiment.

Seventh Embodiment (FIG. 12)

In this embodiment, brackets 20 and 25 and links 22 and 27 are simple in structure, and a method for coupling them is also simple. Each of the brackets 20 and 25 is formed by bending a thick metal plate in such a manner as to have a cross section that looks like "L" when viewed from above. Each of the links 22 and 27 is a flat plate and simple in structure.

In this embodiment, the base portion 20b, 25b of each brackets 20, 25 is secured to the inner side face of a cushion frame 12 at two points by means of fastening members 31 (such as bolts or rivets), as in the first embodiment. The number of fastening members required in the seventh embodiment is half of the corresponding number of the embodiment shown in FIG. 1. The embodiment shown in FIG. 12 is advantageous in that the brackets 20 and 25 and the links 22 and 27 are simple in structure, and that the number of fastening members 31 required is small. In addition, since the operation for coupling to the submarine preventing body 30 is easy, a reduction in the manufacturing cost is enabled.

Figure 13:
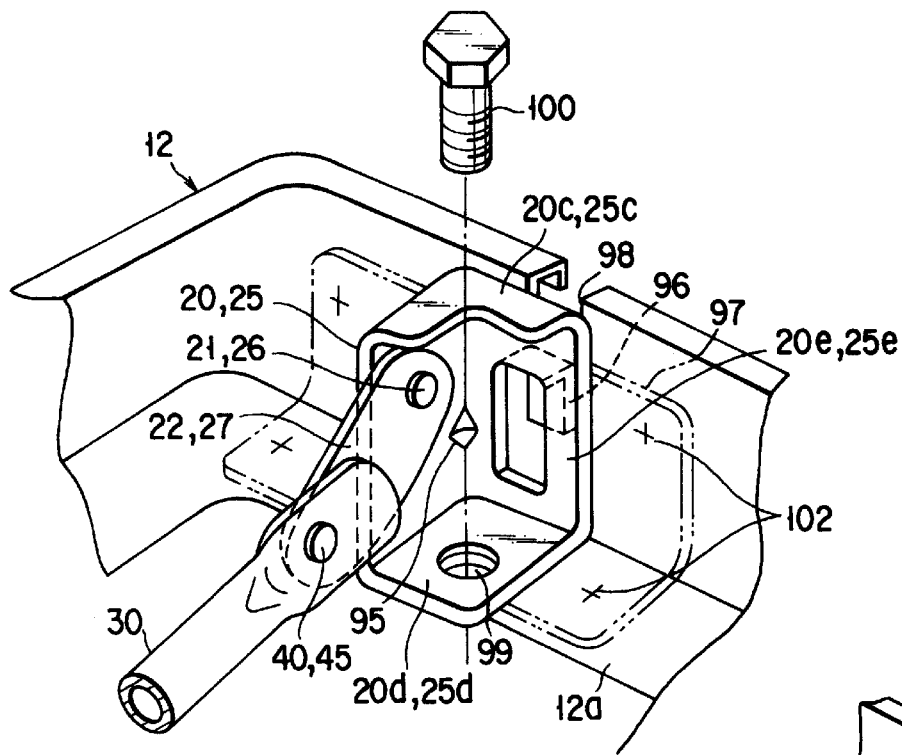
FIG. 13 is a perspective view of part of a submarine preventing mechanism according to the eighth embodiment.
Figure 14:
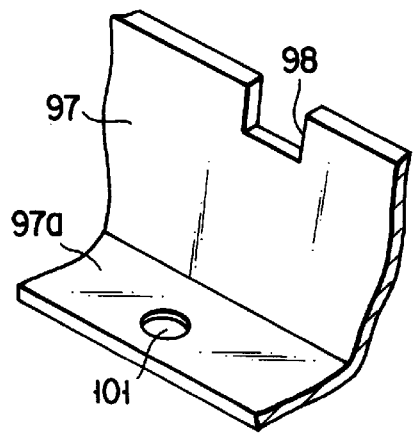
FIG. 14 is a perspective view of a reinforcing plate employed in the embodiment shown in FIG. 13.

Eighth Embodiment (FIGS. 13 and 14)

This embodiment is similar to the seventh embodiment in that the brackets 20 and 25 and the links 22 and 27 are simple in structure and that the number of fastening members required is small. In addition, the brackets 20 and 25 are improved in strength and rigidity. To be more specific, each of the brackets 20, 25 has an upper wall 20c, 25c on top and a lower wall 20d, 25d at the bottom. The upper and lower walls are formed by drawing such that they are integral with the main body of the bracket and extend in the horizontal direction. Each bracket 20, 25 has a reinforcing bead 95 at a vertically middle position. Part of the rear wall 20e, 25e is cut and raised, so as to form a hook 96 orientating downward. A cushion frame 12 (and a reinforcing plate 97, if required) is provided with a notch 98 that has such a shape as enables the hook 96 to be fitted into it.

According to the eighth embodiment, the hook 96 is fitted into the notch 98 from above. Then, a bolt 100 is inserted, from above, into a fitting hole formed 99 in the lower wall 20d, 25d. By means of this bolt 100, the bracket 20, 25 is fastened to the flange section 12a of the cushion frame 12. The eighth embodiment provides a simple vertically-fixing type structure, wherein a single bolt 100 is inserted downward from above for fastening. The operation for assembling the submarine preventing mechanism 15 to the cushion frame 12 is very easy to perform.

In the eighth embodiment, the reinforcing plate 97, which is employed in accordance with the need, may be simple. For example, a reinforcing plate having an "L"-shaped cross section, as shown in FIG. 14, is sufficient for use. Where such a reinforcing plate is employed, it is preferable that the lower wall 97a thereof have a hole 101 into which the bolt 100 can be inserted. As shown in FIG. 13, the reinforcing plate 97 fixed to the flange section 12a of the cushion frame 12 by executing spot welding or arc welding at fixing points 102 or by using rivets at the points 102.

Figure 15:
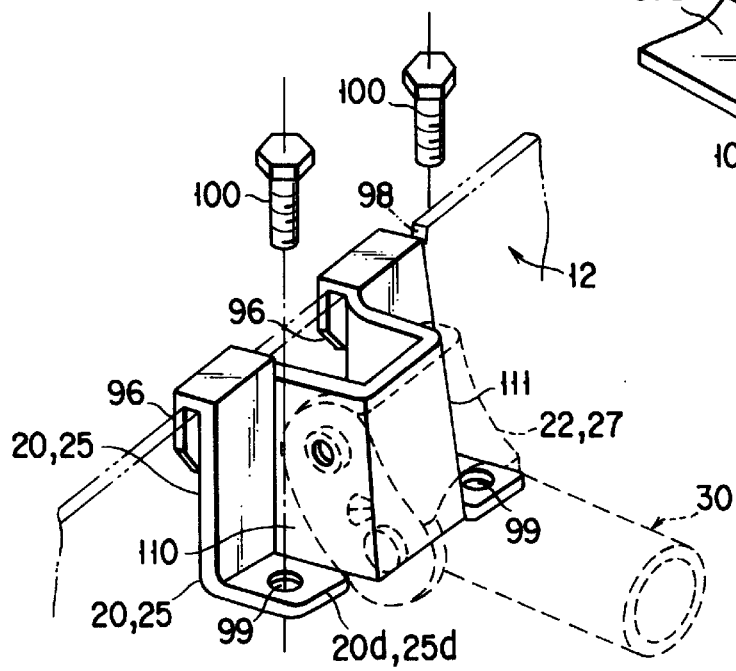
FIG. 15 is a perspective view of part of a submarine preventing mechanism according to the ninth embodiment.

Ninth Embodiment (FIG. 15)

According to this embodiment, each of the brackets 20 and 25 is provided with a pair of side walls 110 and 111. A link 22, 27 is supported at two points by the side walls 110 and 111 (two-point support). As in the eighth embodiment (FIG. 13) described above, each bracket 20, 25 has hooks 96, and these hooks are fitted from above into notches 98 formed in the upper edge portion of the cushion frame 12 or reinforcing plate, for positioning.

The bracket 20, 25 has a pair of bottom walls 20*d*, 25*d*, in which fixing holes 99 for vertical fixing are formed. By inserting bolts 100 into the fixing holes 99 from above, the bracket 20, 25 is fixed to the cushion frame 12 in the vertical direction. Since, in this embodiment, each of the links 22 and 27 is supported at two points by the corresponding bracket 20, 25, the strength and rigidity of each link is remarkably improved in comparison with those in the embodiment shown in FIG. 12, wherein each link is supported at a single point.

In the embodiment shown in FIG. 15, two bolts 100 are used for fixing one bracket. Instead of this structure, the inner circumferential edge of one of the fixing holes 99 may be burred to project downward. In this case, the projected edge is fitted in a hole formed in the cushion frame 12, for positioning and for resisting a shearing force. A bolt 100 is inserted into the other fixing hole 99 so as to fix the bracket to the cushion frame 12. In this manner, vertical fixing is enabled by use of a single bolt 100.

Figure 16:
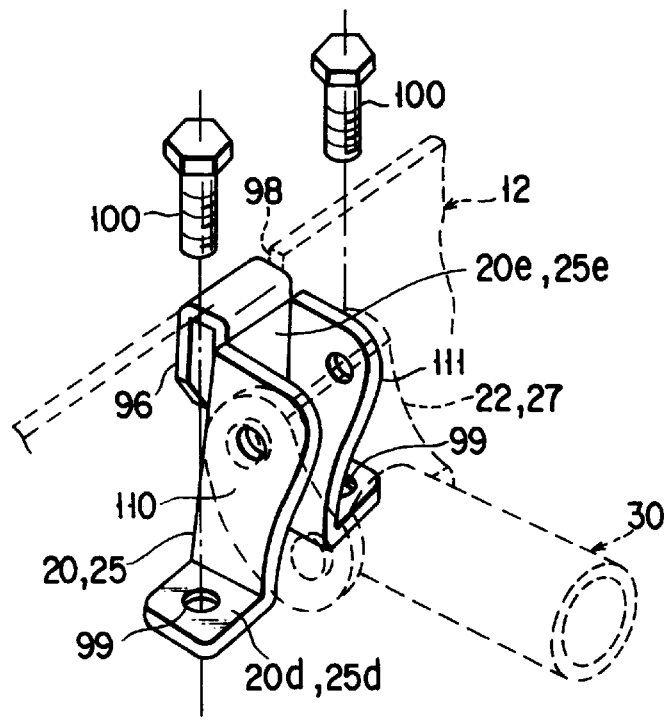
FIG. 16 is a perspective view of part of a submarine preventing mechanism according to the tenth embodiment of the present invention.

Tenth Embodiment (FIG. 16)

This embodiment may be similar to the ninth embodiment shown in FIG. 15 in that the brackets 20, 25 and the links 22, 27 are improved in strength. That is, each of the brackets 20 and 25 is provided with a pair of side walls 110 and 111, and a link 22, 27 is supported by the side walls 110 and 111 at two points (two-point support). In addition to this structure, a hook 96 is formed on the rear wall 20*e*, 25*e* of each bracket 20, 25. The hook 96 is fitted from above into a notch 98 formed in the upper edge portion of the cushion frame 12 (or a notch formed in the upper edge portion of the reinforcing plate). In this manner, each of the brackets 20 and 25 is positioned with reference to the cushion frame 12.

According to this embodiment, each of the brackets 20 and 25 has a pair of lower walls 20*d*, 25*d*, and fixing holes 99 are formed in the respective lower walls 20*d*, 25*d*. With bolts 100 inserted into the fixing holes 99 from above, each bracket 20, 25 can be fixed to the cushion frame 12 from above (vertical fixing). In comparison with the ninth embodiment shown in FIG. 15, the tenth embodiment is advantageous in that the brackets 20 and 25 can be formed of a small amount of material, thus contributing to an improved yield factor.

As in the ninth embodiment, the inner circumferential edge of one of the fixing holes 99 may be burred to project downward, and the projected edge is fitted in a hole formed in the cushion frame 12, for positioning and for resisting a shearing force.

Figure 17:
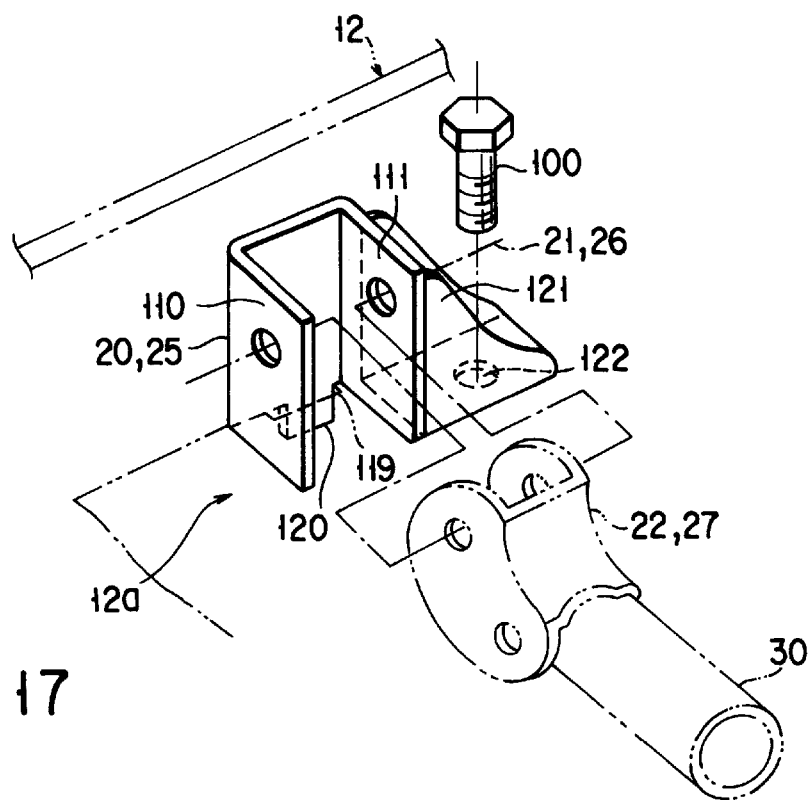
FIG. 17 is a perspective view of part of a submarine preventing mechanism according to the eleventh embodiment of the present invention.

Eleventh Embodiment (FIG. 17)

According to this embodiment, each of the brackets 20 and 25 has a projection 120 at the lower end, and the projection 120 is adapted for insertion into a hole 119 formed in the flange section 12*a* of the cushion frame 12. An auxiliary bracket 121 is welded to one (111) of the side walls of the bracket 20, 25. The auxiliary bracket 121 may be integrally formed with the bracket 20, 25 as one piece from the beginning. In the case of this embodiment, the auxiliary bracket 121 has a hole 122, and a bolt 100 is inserted into the hole 122 from above. The bracket 20, 25 is fixed to the flange section 12*a* of the cushion frame 12 by means of that bolt 100. In this manner, vertical fixing of each bracket 20, 25 is enabled.

Figure 18:
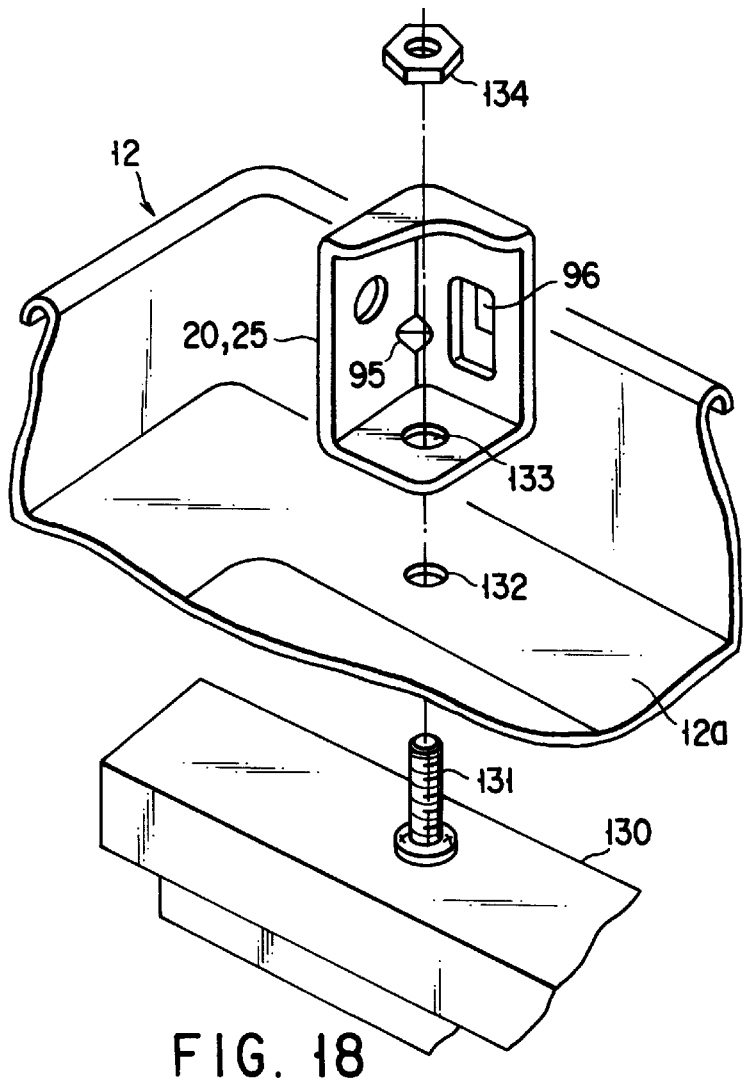
FIG. 18 is a perspective view of part of a submarine preventing mechanism according to the twelfth embodiment of the present invention.

Twelfth Embodiment (FIG. 18)

According to this embodiment, a bracket 20, 25 and a cushion frame 12 are fastened together by means of a stud bolt 131. The stud bolt 131 is employed in a conventional seat slide mechanism so as to couple the cushion frame 12 to a slide rail 13. The stud bolt 131 is fixed to the slide rail 130 by welding, for example, and is projected upward. The stud bolt 131 in this state is inserted first into a hole 132 formed in the cushion frame 12 and then into a hole 133 formed in the bracket 20, 25. A nut 134 is fitted on the projected portion of the stud bolt 131 and tightened from above.

This embodiment is advantageous in that the stud bolt 131 and the nut 134, both employed in the conventional seat slide mechanism, can be utilized fastening the bracket 20, 25, and additional fastening members, such as additional bolts and nuts, need not be employed. Owing to this, an efficient assembling operation is ensured, the number of fastening members required is small, and a low manufacturing cost is attained.

There is a seat wherein a known type of tilt mechanism is arranged between the slide rail 130 and the cushion frame 12 (the tilt mechanism is a member used for adjusting the tilt angle of the cushion frame 12). In the case of such a seat, the tilt mechanism located between the slide rail 130 and the cushion frame 12 prevents the bracket 20, 25 from being fastened to the slide rail 130. In such a case, however, a bolt for fastening the tilt mechanism and the cushion frame 12 can be utilized for fixing the bracket 20, 25.

Figures 19A, 19B:
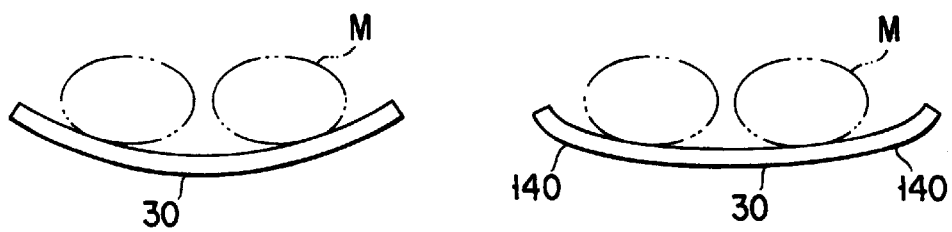
FIG. 19A is a front view showing how a submarine preventing body is deformed.
FIG. 19B is a front view showing how a submarine preventing body according to the thirteenth embodiment operates.
Figure 20:
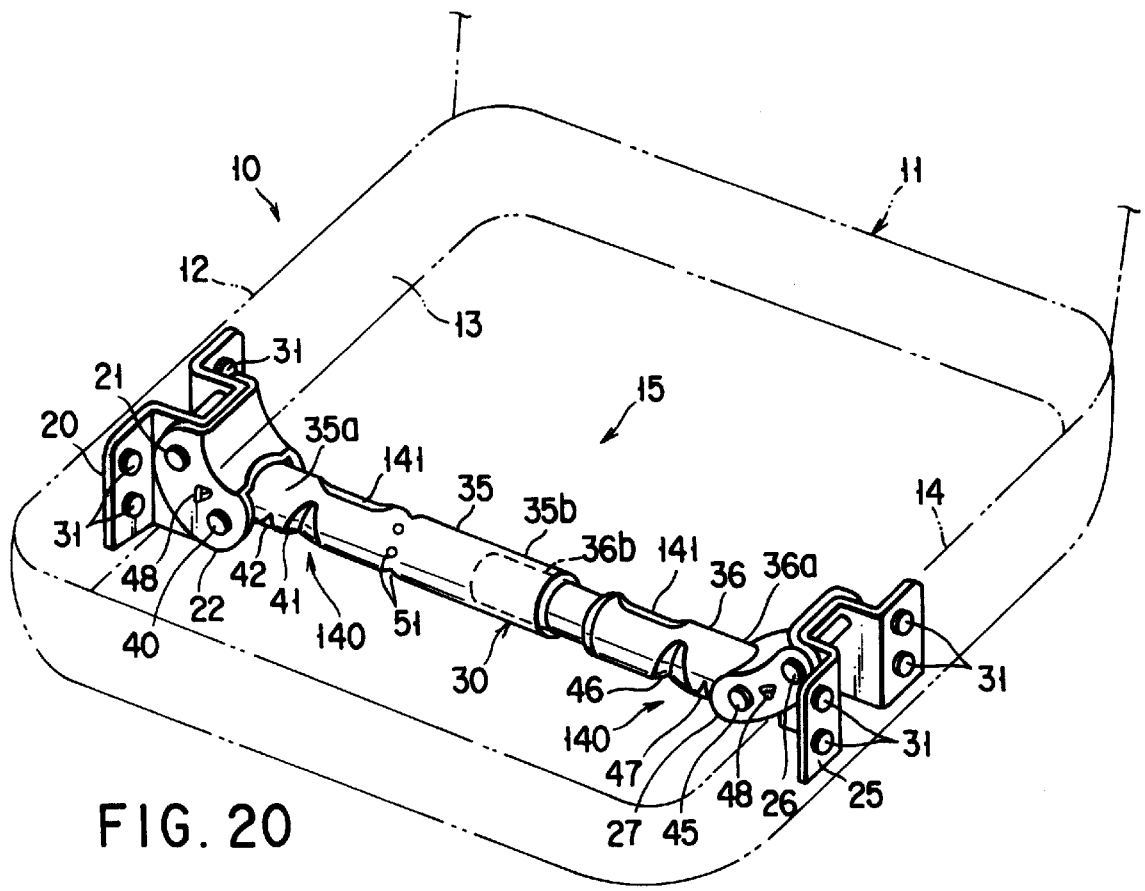
FIG. 20 is a perspective view of the seat vehicle of the thirteenth embodiment.

Thirteenth Embodiment (FIGS. 19B and 20)

According to this embodiment, the pressure which the submarine preventing body 30 may be exerted by the load of the driver or passenger M when the submarine preventing mechanism 15 is actuated (i.e., when the submarine preventing body 30 is raised) is suppressed by taking the following measures: the submarine preventing body 30 has deformation adjuster sections 140 near the end portions connected to the links 22 and 27. The deformation adjuster sections 140 are specifically a section having depressions 41 and 42 and a section having depressions 46 and 47. Further, the upper surfaces of portions close to the end of the body 30 are flattened more or less, so as to form wide pressure-receiving areas 141.

If the geometrical moment of inertia of the submarine preventing body 30 is uniform throughout the overall length, the submarine preventing mechanism 15 is deformed in the manner indicated in the schematic illustration in FIG. 19A. In other words, when the submarine preventing body 30 is raised and is subjected to the load of the driver or passenger M acting from above, the longitudinal center of the submarine preventing body 30 will be greatly curved in the manner indicated in FIG. 19A. If the submarine preventing body 30 is deformed in the manner shown in FIG. 19A, the contact area between the submarine preventing body 30 and the driver's or passenger's thighs or buttocks is inevitably short. As a result, the load is exerted concentratedly, resulting in high pressure being applied on a particular area.

In solve this problem, the submarine preventing body 30 of the thirteenth embodiment is provided with the deformation adjuster sections described above. Owing to this feature, the submarine preventing body 30 is deformed in the manner shown in FIG. 19B. As shown in FIG. 19B, the contact area between the submarine preventing body 30 and the driver's or passenger's thighs or buttocks is long. In other words, the longitudinal center of the submarine preventing body 30 is comparatively flat.

Moreover, the submarine preventing body 30 is provided with the wide pressure-receiving areas 141 described above. Owing to this, the area on which the load of the driver or passenger is exerted is as wide as possible. With this structure, the peak reaction (i.e., maximal reaction) produced during the actuation of the submarine preventing body 30 is not intense, and the reaction is as uniform as possible. In addition, the pressure exerted can be reduced, and the submarine preventing body 30 can absorb a large amount of energy.

Figure 21:
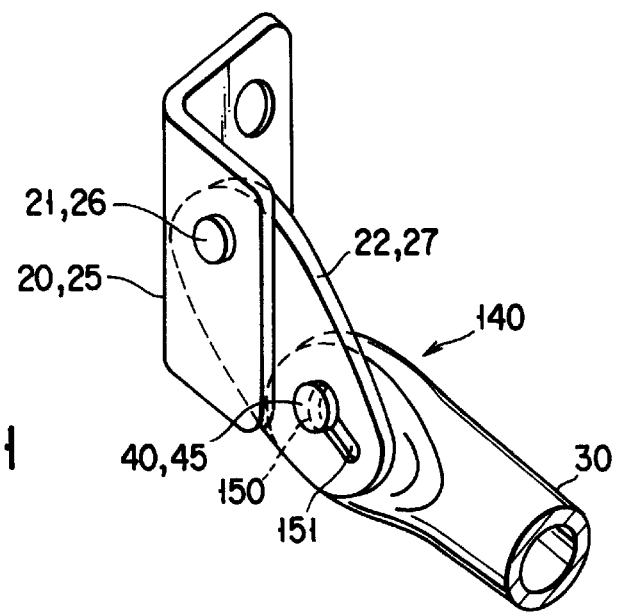
FIG. 21 is a perspective view of part of a submarine preventing mechanism according to the fourteenth embodiment of the present invention.
Figure 22:
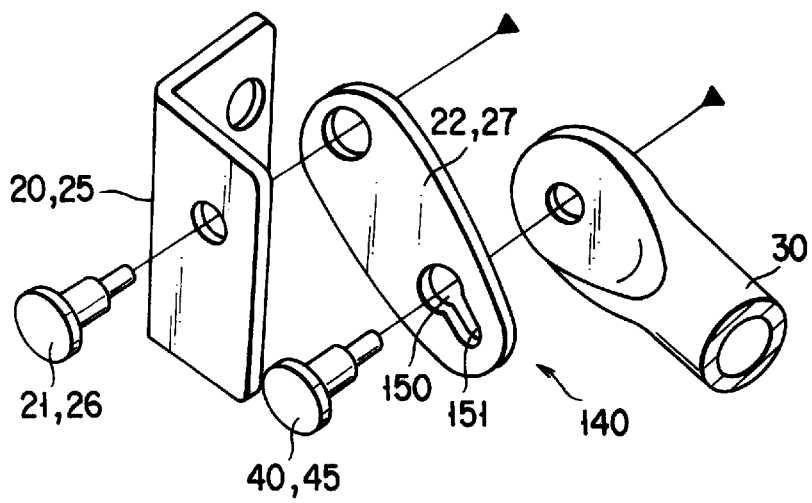
FIG. 22 is an exploded perspective view of a bracket and a link, which are employed in the embodiment shown in FIG. 21.

Fourteenth Embodiment (FIGS. 21 and 22)

Like the thirteenth embodiment, the fourteenth embodiment is intended to reduce the pressure which the submarine preventing body 30 is exerted when the submarine preventing mechanism 15 is actuated (i.e., when the submarine preventing body 30 is raised). To attain this intention, each of the links 22 and 27 is supported by the corresponding brackets 20 and 25 at one point. With this structure, the submarine preventing body 30 can be deformed more easily at the end portions than at the central portion.

As shown in FIG. 22, that hole 150 of each link 22, 27 into which a connection shaft 40, 45 is inserted has an elongated slit extending in the longitudinal direction of the link. With this structure, the connection shaft 40, 45 bites into the slit 151 by the heavy load applied when the submarine preventing body 30 is actuated. Hence, the energy caused by a collision can be absorbed in accordance with the degree of plastic deformation. A similar energy absorbing effect can be expected in the case of the seventh embodiment (FIG. 12), wherein each link 22, 27, which is a metal plate, is supported at a single point.

Figure 23:
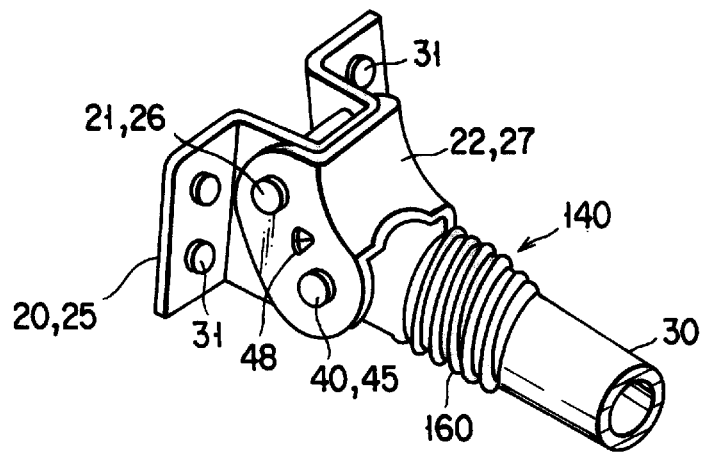
FIG. 23 is a perspective view showing part of a submarine mechanism according to the fifteenth embodiment of the present invention.

Fifteenth Embodiment (FIG. 23)

To attain the same intention as the thirteenth and fourteenth embodiments, the submarine preventing body 30 of the fifteenth embodiment has bellows portions 160 at the end portions. With this structure, the end portions of the body 30 can be more easily deformed than the central portion, and thus serve as deformation adjuster sections 140.

Figure 24:
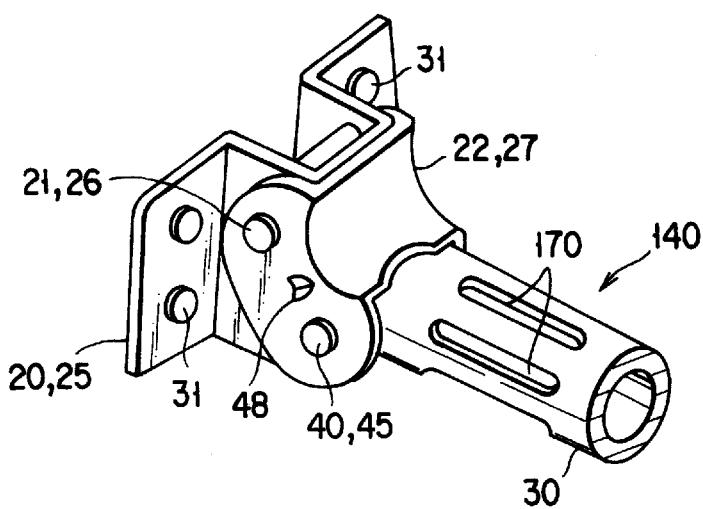
FIG. 24 is a perspective view showing part of a submarine mechanism according to the sixteenth embodiment of the present invention.

Sixteenth Embodiment (FIG. 24)

To attain the same intention as the thirteenth and fourteenth embodiments, the submarine preventing body 30 of the sixteenth embodiment has cutout sections 170, such as holes or notches formed in the end portions. With this structure, the end portions of the member 30 can be more easily deformed than the central portion, and thus serve as deformation adjuster sections 140.

Figure 25:
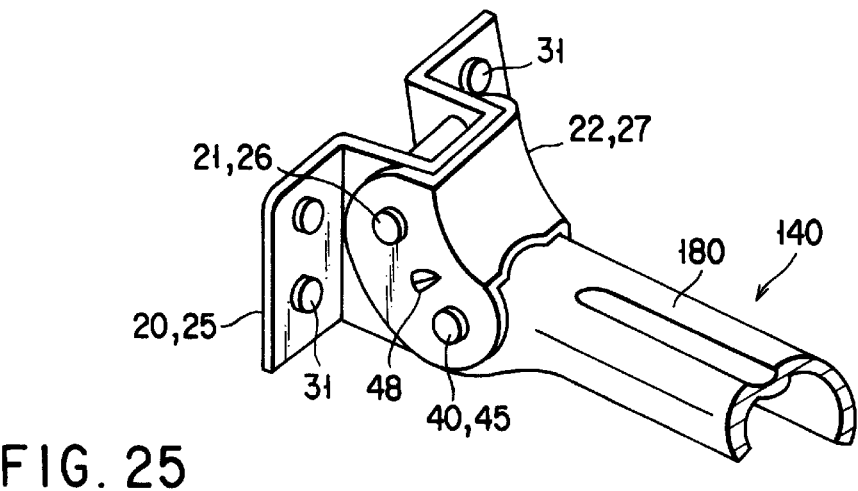
FIG. 25 is a perspective view showing part of a submarine preventing mechanism according to the seventeenth embodiment of the present invention.
Figure 26:
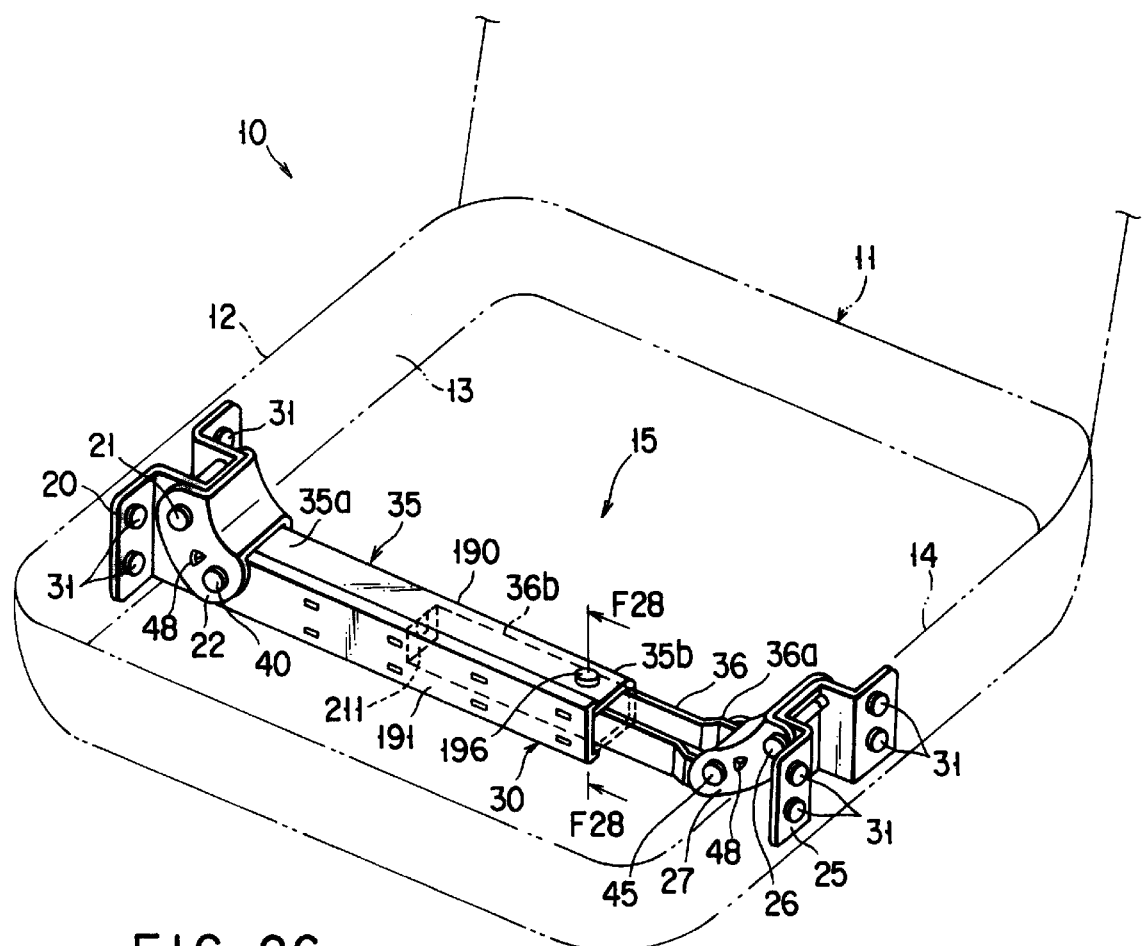
FIG. 26 is a perspective view of a vehicle seat according to the eighteenth embodiment of the present invention.

Seventeenth Embodiment (FIG. 25)

To attain the same intention as the thirteenth and fourteenth embodiments, the submarine preventing body 30 of the seventeenth embodiment is made by working a metal plate member 180 in such a manner as to have portions functioning as deformation adjuster sections 140 and wide pressure-receiving areas 141. With this structure, the load of the driver or passenger is controlled to be exerted on a wide area (a pressure-receiving area), and the rigidity of the submarine preventing body 30 is varied depending upon the portions. The seventeenth embodiment, wherein the metal plate 180 is worked, is advantageous in that the seat can be designed with a high degree of freedom.

Eighteenth Embodiment (FIGS. 26–29)

Figure 27:
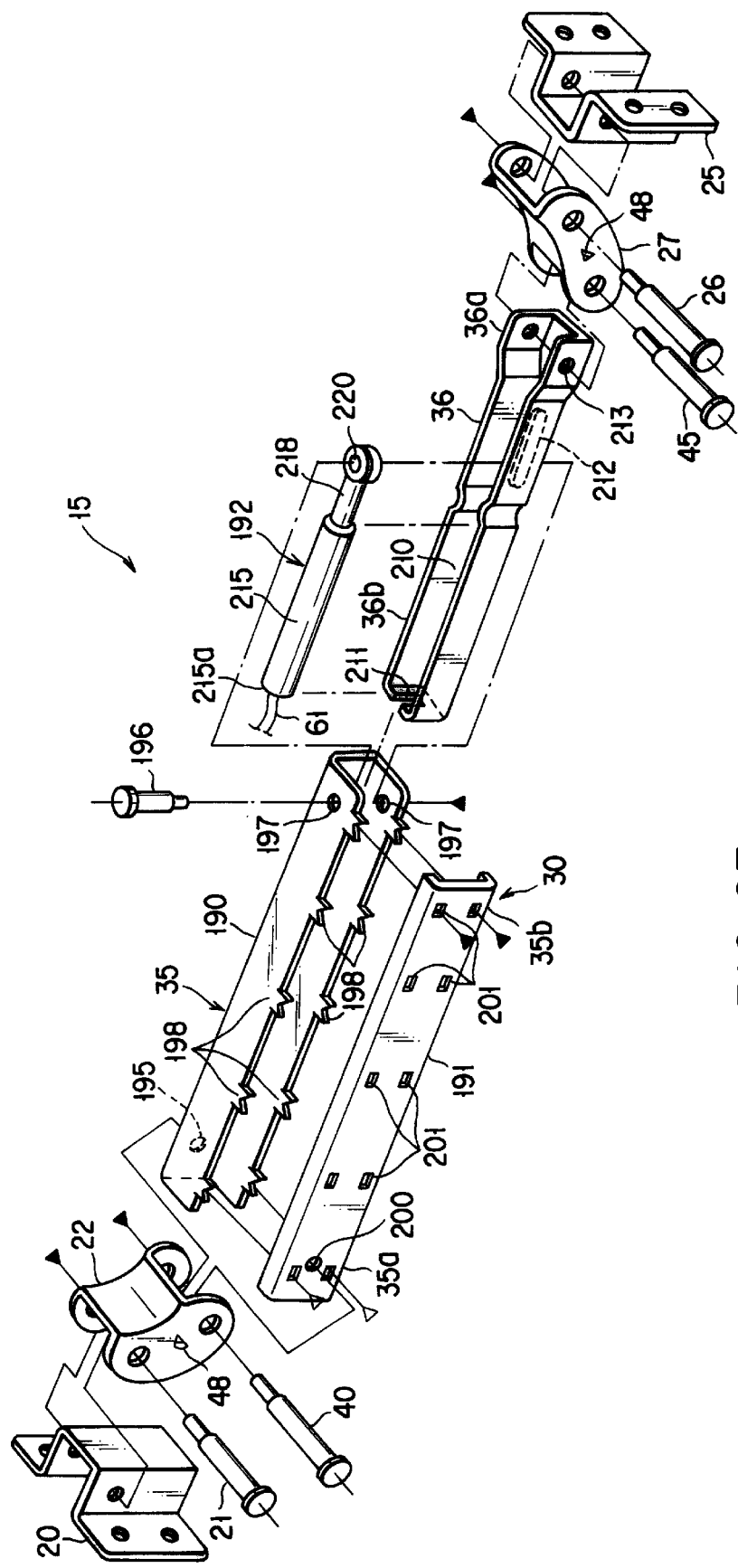
FIG. 27 is an exploded perspective view showing the submarine preventing mechanism employed in the embodiment depicted in FIG. 27.
Figure 28:
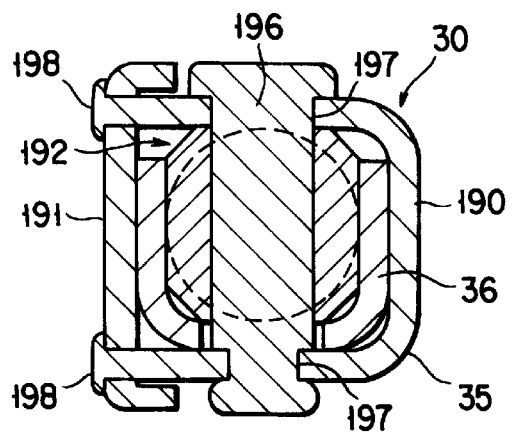
FIG. 28 is a sectional view of the submarine preventing mechanism, which is taken along line F28—F28 in FIG. 26.

According to this embodiment, the first rod 35 of a submarine preventing body 30 is made of frame elements 190 and 191, and each of these frame elements is obtained by press-working a metal plate to have a "U"-shaped cross section. As shown in FIG. 27, the second rod 36 contains an actuator 192. Of the two frame elements, the one denoted by 190 comprises a hole 195 into which a connection shaft 40 is inserted, holes 197 into which a pin 196 for fixing the end portion of the operating member 218 of an actuator 192 is inserted, a plurality of projections 198 for crimp fixing, etc. The other frame element 191 comprises a hole 200 into the connection shaft 40 is inserted, holes 201 into which the corresponding projections are inserted.

The second rod 36 is formed by press-working a metal plate. The second rod 36 comprises a hollow section 210 in which the actuator 192 is contained, a stopper wall 211 for supporting the rear end face 215a of the cylinder 215 of the actuator 192, an elongated hole 212 into which pin 196 is inserted, holes 213 into a connection shaft 45 is inserted, etc.

Figure 29:
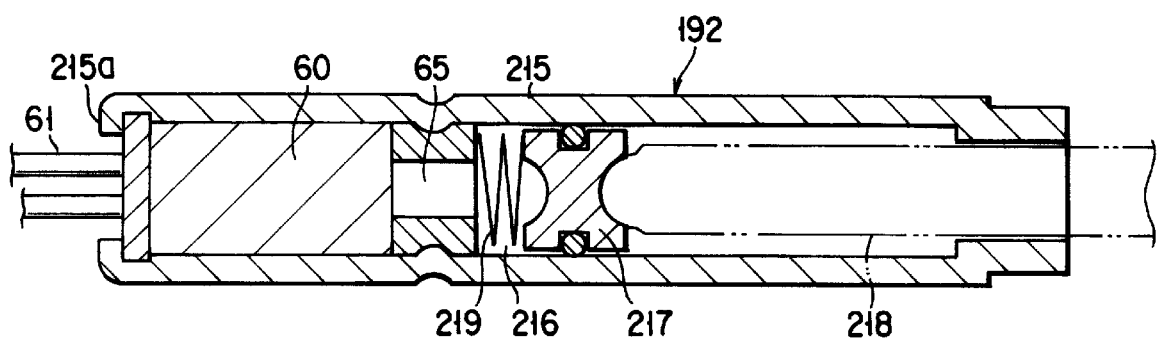
FIG. 29 is a sectional view of an actuator employed in the embodiment depicted in FIG. 29.

As shown in FIG. 29, the actuator 192 comprises a cylinder 215, a gas generator 60 contained in the cylinder 215, a gas expansion chamber 216, a piston 217 inserted into the cylinder 215 and axially movable therein, an operating member 218 which is axially movable together with the piston 217, a spring 219. The external end of the operating member 218 (i.e., one end of the actuator 192) has a fixing hole 220, into which pin 196 is inserted. The pin 196 is inserted into holes 197 of the first rod 35.

According to the embodiment, the gas generator 60 burns in response to a collision, and the gas generated then expands and urges both the piston 217 and the operating member 218 to move out of the cylinder 215. The operating member 218 is fixed to the first rod 35 by means of pin 196, and the end face 215a of the cylinder 215 (i.e., the other end of the actuator 192) is brought into contact with the stopper wall 211 of the second rod 36. When the cylinder 215 and the operating member 218 move in an extending direction, the second rod 36 is pulled into the first rod 35. As in the first embodiment, therefore, links 22 and 27 rotate upward around support shafts 21 and 26, respectively. Accordingly, the submarine preventing body 30 is raised, thus suppressing the submarine phenomenon.

The eighteenth embodiment (FIGS. 26 and 27) is advantageous in that the actuator 192 can be contained in the submarine preventing body 30 as a unit structure. When the submarine preventing mechanism 15 is fabricated or assembled into the seat cushion 11, the actuator 192 can be easily handled as a unit member.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vehicle seat comprising:

a cushion frame;

a pair of brackets provided at respective sides of the cushion frame;

a submarine preventing body arranged between the pair of brackets, said submarine preventing body including a first rod, a second rod inserted into the first rod to be axially movable, and an actuator having a gas generator that generates a gas in response to a vehicle collision, said second rod being pushed into the first rod in response to generation of the gas from the gas generator; and a pair of links, arranged between the pair of brackets and respective ends of the submarine preventing body, for connecting the submarine preventing body to the pair of brackets such that the submarine preventing body is raised when the second rod is pulled into the first rod.

2. A vehicle seat according to claim 1, wherein each of said pair of links has a first end and a second end, the first end if each pair of links is rotatably supported by one bracket of said pair of brackets by means of a respective support shaft, the second end of one of the pair of links is rotatably coupled to an end of the first rod by means of a connection shaft at a position lower in level than the support shaft, the second end of another of said pair of links is rotatably coupled to an end of the second rod by means of another connection shaft at a position lower in level than the support shaft, and the support shafts, the first and second rods and the connection shafts are arranged to satisfy the following relationships:

$$L > L1 > L2$$

where L is a distance by which the support shafts are away from each other, L1 is a distance by which the connection shafts are away from each other before the second rod is pulled into the first rod, and L2 is a distance by which the connection shafts are away from each other after the second rod is pulled into the first rod.

3. A vehicle seat according to claim 1, wherein each of said pair of brackets has a hole extending in a vertical direction, and a bolt is inserted into the hole from above, so as to fix each of said pair of brackets to a seat cushion.

4. A vehicle seat according to claim 1, wherein said submarine preventing body includes deformation adjuster sections at end portions which are close to the said pair of brackets, and said submarine preventing body is more easily deformable at the deformation adjuster sections than at a longitudinal center thereof when said submarine body is exerted on by a load from above during a collision.

5. A vehicle seat according to claim 1, wherein said actuator includes a cylinder which contains the gas generator, and an operating member which is inserted in the cylinder and moves in such a direction as to extend from the cylinder when the gas generator generates a gas, and said actuator is supported at one end by the first rod and at another end by the second rod, such that the second rod is pulled into the first rod when the operating member moves and projects from the cylinder.

* * * * *